(12) United States Patent
Kaizu et al.

(10) Patent No.: US 7,333,289 B2
(45) Date of Patent: *Feb. 19, 2008

(54) MAGNETIC RECORDING AND REPRODUCING APPARATUS, METHOD OF CONTROLLING THE SAME, MAGNETIC RECORDING MEDIUM, AND STAMPER FOR MANUFACTURING MAGNETIC RECORDING MEDIUM

(75) Inventors: Akimasa Kaizu, Tokyo (JP); Yoshikazu Soeno, Tokyo (JP); Makoto Moriya, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/377,188

(22) Filed: Mar. 17, 2006

(65) Prior Publication Data

US 2006/0215311 A1 Sep. 28, 2006

(30) Foreign Application Priority Data

Mar. 22, 2005 (JP) .............................. 2005-081323

(51) Int. Cl.
*G11B 5/596* (2006.01)
*G11B 5/02* (2006.01)

(52) U.S. Cl. .................. 360/77.08; 360/29; 360/39; 360/78.04

(58) Field of Classification Search ...................... None
See application file for complete search history.

(56) References Cited

U.S. PATENT DOCUMENTS

| | | | | |
|---|---|---|---|---|
| 5,067,039 A | * | 11/1991 | Godwin et al. ............ | 360/135 |
| 5,296,995 A | * | 3/1994 | Yonezawa et al. ........... | 360/135 |
| 5,515,212 A | * | 5/1996 | Chiao et al. .............. | 360/77.03 |
| 6,088,200 A | * | 7/2000 | Morita ....................... | 360/135 |
| 6,262,860 B1 | * | 7/2001 | Ishida ...................... | 360/78.05 |
| 6,347,016 B1 | * | 2/2002 | Ishida et al. .................. | 360/17 |
| 6,519,715 B1 | * | 2/2003 | Takashi et al. ............... | 714/32 |
| 6,757,116 B1 | * | 6/2004 | Curtiss et al. ................ | 360/15 |
| 7,095,581 B2 | * | 8/2006 | Tagami .................... | 360/77.08 |
| 7,126,774 B2 | * | 10/2006 | Kaizu et al. .................. | 360/46 |
| 7,136,252 B2 | * | 11/2006 | Tagami .................... | 360/77.08 |
| 2003/0210491 A1 | | 11/2003 | Kuroda et al. | |

FOREIGN PATENT DOCUMENTS

JP A 06-195907 7/1994
JP A 2003-323772 11/2003

OTHER PUBLICATIONS

Howard M. Berlin, The Illustrated Electronics Dictionary, 1986, p. 73.*

* cited by examiner

*Primary Examiner*—K. Wong
(74) *Attorney, Agent, or Firm*—Oliff & Berridge, PLC

(57) ABSTRACT

A magnetic recording and reproducing apparatus and a method of controlling the same, capable of increasing the output of a position control signal and performing a precise positioning control of a magnetic head. The magnetic recording and reproducing apparatus has: a magnetic recording medium on which a positional information is recorded in the form of burst signal groups each consisting of either one of a single concave portion and a single convex portion of a predetermined concavo-convex pattern formed of a magnetic layer; a gate circuit; and an integrator for calculating a area integral of a reproduced signal corresponding to each of the burst signal groups.

12 Claims, 13 Drawing Sheets

Concavo-convex pattern

Reproduced output

MAGNETIC RECORDING AND REPRODUCING APPARATUS, METHOD OF CONTROLLING THE SAME, MAGNETIC RECORDING MEDIUM, AND STAMPER FOR MANUFACTURING MAGNETIC RECORDING MEDIUM

BACKGROUND OF THE INVENTION

1. Field of the Invention

The invention relates to a magnetic recording and reproducing apparatus having a magnetic recording medium such as a discrete track medium and a patterned medium, a method of controlling the same, a magnetic recording medium, and a stamper for manufacturing a magnetic recording medium.

2. Description of the Related Art

Conventionally, a magnetic recording and reproducing apparatus that has a magnetic recording medium on which a positional information to be used for a positioning control of its magnetic head is recorded has been known widely.

FIG. 19 shows an example of the magnetic recording medium with which such conventional, publicly-known magnetic recording and reproducing apparatus is equipped.

The magnetic recording medium 100 shown in FIG. 19 has a plurality of servo regions 102 which are formed in radial shape at predetermined intervals, each formed of a concavo-convex pattern formed of a magnetic layer. As shown enlarged in FIG. 20, each of the servo regions 102 stores servo information which includes a preamble part 104, a servo mark part 106, an address part 108 which contains address information, and a burst part 110 which contains a positional information. The reference numeral 112 in the diagram designates data tracks for storing user data.

A burst pattern composed of four types of burst signal groups 110A, 110B, 110C, and 110D is formed in this burst part 110 of the servo region 102 as the positional information. The burst signal groups 110A and 110B are arranged to lie evenly across the center line of the data tracks 112 as a pair of pieces of the positional information. Meanwhile, the burst signal groups 110C and 110D are arranged to lie a half track pitch off from the burst signal groups 110A and 110B as another pair of pieces of the positional information.

FIG. 21 is an enlarged view of the burst signal group 110A. Incidentally, the other burst signal groups 110B, 110C, and 110D also have the same structure.

As shown in FIG. 21, the burst signal group 110A (110B, 110C, 110D) consists of a plurality (typically 10 to 30 or so) of convex portions (the crosshatched areas in FIG. 21) formed of a magnetic layer (magnetic material), the convex portions being arranged in the circumferential direction. The convex portions have a length of BL1 in the circumferential direction, and a width of BW1 in the radial direction and concave portions have a length of BL2 in the circumferential direction. In typical magnetic recording and reproducing apparatus, the magnetic recording medium 100 is rotated at a constant angular velocity. The circumferential length BL1 of the convex portions and the circumferential length BL2 of the concave portions thus depend on the radial position on the magnetic recording medium 100. The concavo-convex pattern is then formed so that the circumferential length BL1 of the convex portions and the circumferential length BL2 of the concave portions increase from the inner to the outer periphery.

The burst pattern of the burst part 110 is formed by arranging a plurality of individual burst signal groups (110A, 110B, 110C, 110D) in the radial direction at intervals of a width BW2 as shown in FIG. 22.

Such a burst pattern is reproduced, for example, by a position control circuit 130 shown in FIG. 23. This position control circuit 130 comprises an amplifier 116, a differentiator 118, a zero crossing detector 120, a comparator 122, a peak detector 124, a sample hold unit 126, and a differential amplifier circuit 128, and constitutes a circuit intended for a positioning control of so-called peak detected type. The amplifier 116 amplifies a reproduced signal read by a magnetic head 114. The differentiator differentiates the reproduced signal. The comparator 122 generates a predetermined gate pulse signal. The peak detector 124 detects a maximum output (peak output) of the reproduced signal and generates a position control signal. The sample hold unit 126 holds the position control signal.

The zero crossing detector 120 is a circuit for generating a predetermined signal while the signal differentiated by the differentiator 118 has zero intensity. For example, it generates the predetermined signal when the reproduced output read by the magnetic head 114 has a maximum value (peak value).

The comparator 122 is configured to generate a gate pulse when the reproduced output reaches or exceeds a certain output. Since the zero crossing detector 120 can generate the predetermined signal even if the reproduced output is zero, unnecessary signals occurring from the zero crossing detector 120 are removed by gate pulse signal.

After a burst pattern recorded on the magnetic recording medium 100 is read by the magnetic head 114, the signal reproduced from the burst pattern is amplified by the amplifier 116, and input to the differentiator 118. The reproduced signal differentiated by the differentiator 118 is passed through the zero crossing detector 120, and then input to the peak detector 124. Subsequently, the peak detector 124 detects a position where the gate pulse signal from the comparator 122 and the signal from the zero crossing detector 120 both are present. The reproduced output from the amplifier 116 at that position is the maximum output (peak output). This maximum output is output to the sample hold unit 126 as a position control signal. Then, the differential amplifier 128 determines a difference in output between the position control signal of the burst signal group 110A and the position control signal of the burst signal group 110B which are held in the sample hold unit 126, or a difference in output between the position control signal of the burst signal group 110C and the position control signal of the burst signal group 110D. The positional information on the magnetic head 114 is thus acquired, followed by a positioning (tracking) control of the magnetic head 114 (for example, see Japanese Patent Laid-Open Publication No. 2003-323772).

Now, in such magnetic recording media as a discrete track medium and a patterned medium, on which burst patterns (positional information) are recorded in the form of a concavo-convex pattern formed of a magnetic layer, magnetization signals of the concavo-convex pattern are recorded with one direction of polarity. Thus, signals reproduced from the concavo-convex pattern thus have a waveform like shown in FIG. 24. Incidentally, the crosshatched areas in FIG. 24 schematically show the plane of the convex portions of the concavo-convex pattern. The waveform of the signal reproduced from the concavo-convex pattern is for situations where the magnetic layer is a perpendicular magnetic recording layer.

As seen above, in magnetic recording media on which burst patterns are recorded in the form of a concavo-convex pattern formed of a magnetic layer, the position control signals to be used for the positioning control of the magnetic head fall to a half or so in output as compared to another example of conventional magnetic recording medium with continuous-film where magnetization signals of the burst patterns are recorded with two directions of polarity. Therefore, improvements on the positioning accuracy of the magnetic head have thus been limited.

Besides, the position control signals are highly susceptible to errors in the configuration, arrangement, and the like of the concavo-convex pattern. To obtain accurate position control signals requires that the concavo-convex pattern be formed with high accuracy, which has caused the problems of an increased manufacturing burden and manufacturing cost.

SUMMARY OF THE INVENTION

In view of the foregoing problems, various exemplary embodiments of this invention provide a magnetic recording and reproducing apparatus and a method of controlling the same, capable of reducing the manufacturing burden and the manufacturing cost while increasing the output of the position control signal and performing a precise positioning control of the magnetic head, as well as a magnetic recording medium for use therein and a stamper for manufacturing a magnetic recording medium to be used for manufacturing this magnetic recording medium.

The inventors of the present invention have found a magnetic recording and reproducing apparatus, a method of controlling the same, a magnetic recording medium, and a stamper for manufacturing a magnetic recording medium which are capable of reducing the manufacturing burden and the manufacturing cost while increasing the output of the position control signal and performing a precise positioning control of the magnetic head as follows.

Various exemplary embodiments of the invention provide a magnetic recording and reproducing apparatus comprising:

a magnetic recording medium on which a positional information is recorded in form of burst signal groups each consisting of either one of a single concave portion and a single convex portion of a concavo-convex pattern formed of a magnetic layer; and a signal integration device for calculating an area integral of each of reproduced signals corresponding to each of the burst signal groups.

Alternatively, various exemplary embodiments of the invention provide a magnetic recording and reproducing apparatus comprising:

a magnetic recording medium on which a positional information is recorded in form of burst signal groups each consisting of either one of a single concave portion and a single convex portion of a concavo-convex pattern formed of a magnetic layer; and a signal extractor for generating a plurality of gate pulse signals for each of reproduced signals corresponding to each of the burst signal groups, the gate pulse signals each having a pulse width smaller than that of each of the reproduced signals, and extracting a plurality of parts of each of the reproduced signals by using the plurality of gate pulse signals.

Moreover, various exemplary embodiments of the invention provide a magnetic recording and reproducing apparatus comprising:

a magnetic recording medium on which a positional information is recorded in form of burst signal groups each including concave portions and convex portions of a concavo-convex pattern formed of a magnetic layer; and a signal extractor for generating a plurality of gate pulse signals for each of reproduced signals corresponding to either one of a single concave portion and a single convex portion included each of the burst signal groups, the gate pulse signals each having a pulse width smaller than that of each of the reproduced signals, and extracting a plurality of parts of each of the reproduced signals by using the plurality of gate pulse signals.

Various exemplary embodiments of the invention provide a method of controlling a magnetic recording and reproducing apparatus, comprising the steps of:

calculating an area integral of each of reproduced signals corresponding to each of burst signal groups of a positional information recorded on a magnetic recording medium in form of the burst signal groups to generate a position control signal, each of the burst signal groups consisting of either one of a single concave portion and a single convex portion of a concavo-convex pattern formed of a magnetic layer; and performing a positioning control of a magnetic head based on the position control signal.

Alternatively, various exemplary embodiments of the invention provide a method of controlling a magnetic recording and reproducing apparatus, comprising the steps of:

generating a plurality of gate pulse signals for each of reproduced signals corresponding to each of burst signal groups of a positional information recorded on a magnetic recording medium in form of the burst signal groups, the gate pulse signals each having a pulse width smaller than that of each of the reproduced signals, each of the burst signal groups consisting of either one of a single concave portion and a single convex portion of a concavo-convex pattern formed of a magnetic layer;

extracting a plurality of parts of each of the reproduced signals by using the plurality of gate pulse signals; and performing a positioning control of a magnetic head by using the extracted parts of the reproduced signal.

Moreover, various exemplary embodiments of the invention provide a method of controlling a magnetic recording and reproducing apparatus, comprising the steps of:

generating a plurality of gate pulse signals for each of reproduced signals corresponding to either one of a single concave portion and a single convex portion included each of burst signal groups of a positional information recorded on a magnetic recording medium in form of the burst signal groups, the gate pulse signals each having a pulse width smaller than that of each of the reproduced signals, each of the burst signal groups including concave portions and convex portions of a concavo-convex pattern formed of a magnetic layer;

extracting a plurality of parts of each of the reproduced signals by using the plurality of gate pulse signals; and performing a positioning control of a magnetic head by using the extracted parts of the reproduced signal.

Various exemplary embodiments of the invention provide a magnetic recording medium on which a positional information is recorded in form of burst signal groups each consisting of either one of a single concave portion and a single convex portion of a concavo-convex pattern formed of a magnetic layer.

Moreover, various exemplary embodiments of the invention provide a stamper for manufacturing a magnetic recording medium provided with a concavo-convex pattern having a concavo-convex shape corresponding to a concavo-convex shape of the concavo-convex pattern of the magnetic recording medium.

The "positional information," shall refer to the information that is used for a positioning (tracking) control of a magnetic head, and typically corresponds to a burst pattern to be recorded on burst part in servo regions.

The "reproduced signals," shall include signals that are output when magnetization signals of the concavo-convex pattern are reproduced with a magnetic head, as well as ones obtained by amplifying the signals.

The "reproduced signal corresponding to a burst signal group" shall refer to one that is generated based on the single concave portion or the single convex portion constituting the burst signal group, out of the foregoing "reproduced signals." It covers a reproduced signal that is generated from the burst signal group alone, as well as a reproduced signal that is reproduced from the burst signal group and other concave portions or convex portions.

The "a concavo-convex shape corresponding to a concavo-convex shape of the concavo-convex pattern of the magnetic recording medium" shall refer to both a concavo-convex shape which agrees with that of the magnetic recording medium in convex and concave positional relation, and a concavo-convex shape which is opposite to that of the magnetic recording medium in convex and concave positional relation.

The magnetic recording and reproducing apparatus and the method of controlling the same according to the present invention have an excellent effect capable of reducing the manufacturing burden and the manufacturing cost while increasing the output of the position control signal and performing a precise positioning control of the magnetic head.

Moreover, the magnetic recording medium according to the present invention has an excellent effect capable of providing a magnetic recording and reproducing apparatus which is capable of reducing the manufacturing burden and the manufacturing cost while increasing the output of the position control signal and performing a precise positioning control on the magnetic head.

Furthermore, the stamper for manufacturing a magnetic recording medium according to the present invention has an excellent effect capable of manufacturing the magnetic recording medium which is capable of reducing the manufacturing burden and the manufacturing cost.

DETAILED DESCRIPTION OF THE PREFERRED EMBODIMENTS

Hereinafter, a magnetic recording and reproducing apparatus, a method of controlling the same, a magnetic recording medium, and a stamper for manufacturing a magnetic recording medium according to a first exemplary embodiment of the present invention, and a magnetic recording and reproducing apparatus and a method of controlling the same according to a second exemplary embodiment will be described with reference to the drawings.

First Exemplary Embodiment

Figure 1:
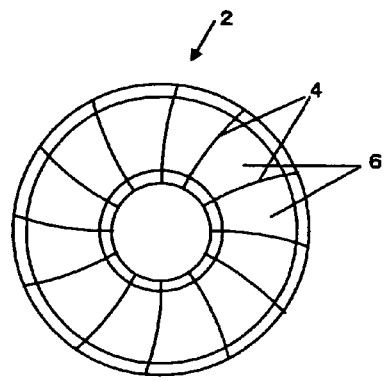
FIG. 1 is a schematic plan view of a magnetic recording medium of a magnetic recording and reproducing apparatus according to a first exemplary embodiment of the present invention.

A magnetic recording and reproducing apparatus (not shown) according to the first exemplary embodiment has a magnetic recording medium 2 of disk shape as shown in FIG. 1. A plurality of servo regions 4 and user data regions 6 are formed on this magnetic recording medium 2 so that they are arranged alternately in the circumferential direction.

Figure 2:
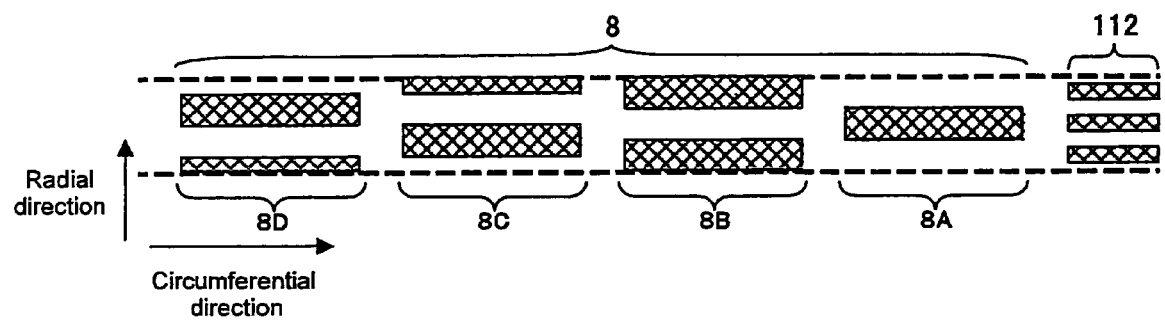
FIG. 2 is a schematic partial enlarged view of the vicinity of a burst pattern in a servo region of the magnetic recording medium of the magnetic recording and reproducing apparatus.

As enlarged in FIG. 2, each servo region 4 contains a burst pattern (positional information) which is composed of a plurality of burst signal groups 8A (8B, 8C, 8D) arranged in the radial direction. As far as the arrangement itself is concerned, the burst signal groups are the same as those of the burst pattern in the conventional magnetic recording medium 100 described above. Incidentally, the reference numeral 112 in the diagram designates data tracks for recording user data.

Figure 3:
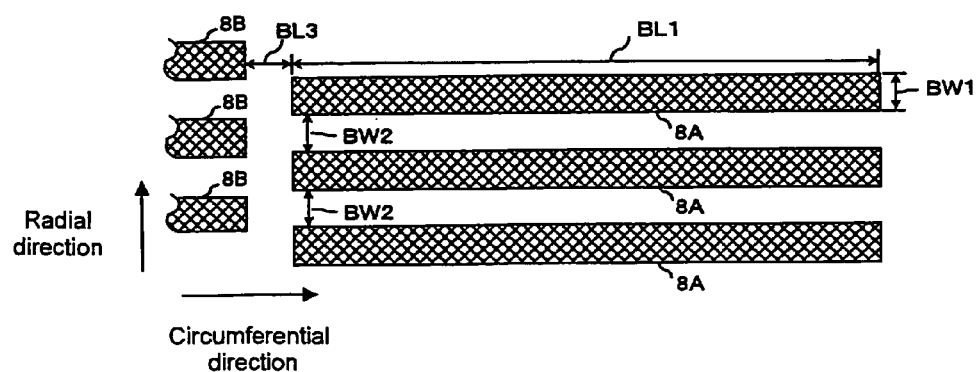
FIG. 3 is a schematic partial enlarged view of part of the burst pattern in the servo region of the magnetic recording medium of the magnetic recording and reproducing apparatus.
Figure 22:
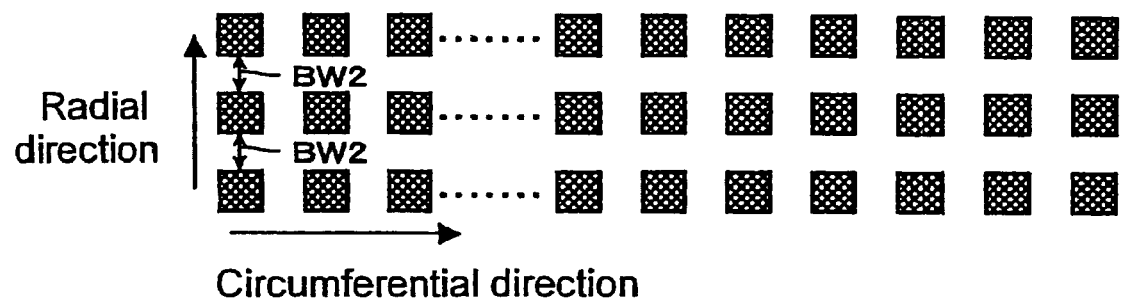
FIG. 22 is a schematic partial enlarged view of part of a burst pattern in the servo region of the magnetic recording medium of the magnetic recording and reproducing apparatus.

FIG. 3 is a diagram corresponding to FIG. 22 seen above, showing part of an enlarged burst pattern formed in a servo region 4 (the entire burst signal group 8A and part of the burst signal group 8B). It should be noted that while FIG. 3 shows the entire burst signal group 8A and part of the burst signal group 8B alone, the other burst signal groups 8C and 8D also have the same structure except the radial positions. In the following description, the reference numeral 8 shall refer to the four types of burst signal groups 8A, 8B, 8C, and 8D.

Figure 4:
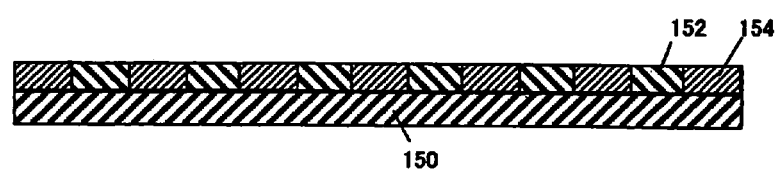
FIG. 4 is a schematic cross-sectional side view showing an example of the magnetic recording medium of the magnetic recording and reproducing apparatus.

Each of the burst signal groups 8 in the burst pattern of the magnetic recording medium 2 is composed of either a single concave portion or single convex portion (in the first exemplary embodiment, a single convex portion). As shown in FIG. 4, this concavo-convex pattern can be created, for example, by forming convex portions 152 formed of a magnetic layer over a substrate 150 which is made of a glass substrate, an underlayer, a soft magnetic layer, a seed layer, etc. Concave portions 154 may be filled with $SiO_2$ or other filling materials.

Meanwhile, the user data regions 6 are provided with a plurality of generally-concentric recording tracks which are convex portions of a predetermined concavo-convex pattern formed of the magnetic layer. The recording tracks are magnetically separated from each other by a plurality of generally-concentric grooves which are the concave portions of the concavo-convex pattern. These user data regions 6 store user data in the form of magnetization information.

Figure 5:
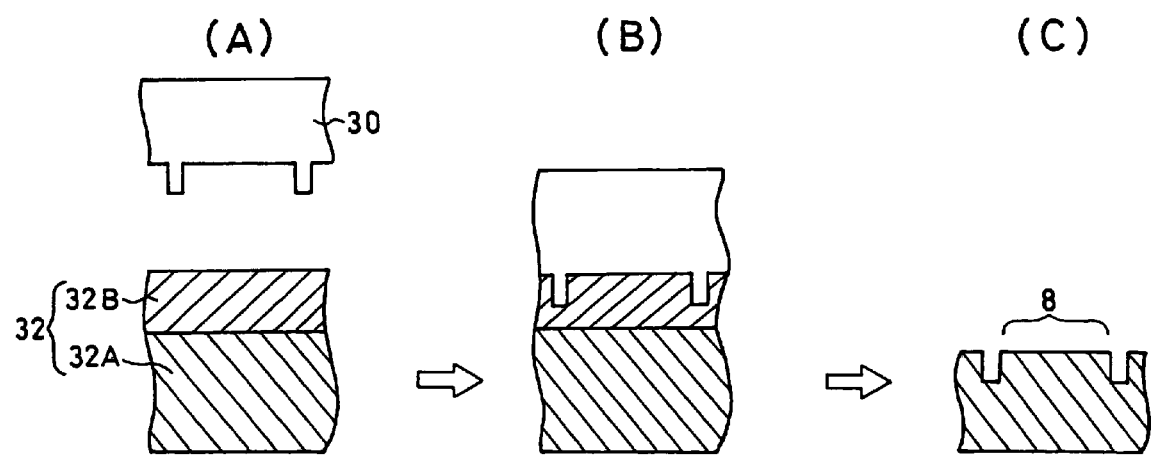
FIGS. 5A to 5C are cross-sectional views schematically showing the steps for forming the concavo-convex pattern on the magnetic recording medium of the magnetic recording and reproducing apparatus.

The concavo-convex pattern of the magnetic recording medium 2 is formed (recorded) on this magnetic recording medium 2 by the steps to be described below, using a stamper 30 for manufacturing a magnetic recording medium as shown in FIG. 5A. Incidentally, the stamper 30 for manufacturing a magnetic recording medium is previously provided with a concavo-convex pattern which has a concavo-convex shape corresponding to a concavo-convex shape of the concavo-convex pattern on the magnetic recording medium 2. That is, the convex portions of the stamper 30 for manufacturing a magnetic recording medium correspond to the concave portions of the magnetic recording medium 2. The concave portions of the stamper 30 for manufacturing a magnetic recording medium correspond to the convex portions of the magnetic recording medium 2.

Initially, the starting body of an object to be processed 32 shown in FIG. 5A is prepared. The starting body of the object to be processed 32 is obtained by applying a resist layer 32B by spin coating on a plate-like member 32A. The plate-like member 32A is formed by sputtering an underlayer, a soft magnetic layer, a seed layer, a continuous recording layer, and a mask layer onto a glass substrate in this order.

Next, as shown in FIG. 5B, the concavo-convex pattern are formed on the resist layer 32B of the starting body of the object to be processed 32, for example, by nanoimprinting technique using the stamper 30 for manufacturing a magnetic recording medium. The resist layer 32B is then removed from the bottoms of the concave portions before the mask layer and the continuous recording layer of the plate-like member 32A are etched off so that the concavo-convex pattern such as shown in FIG. 5C is formed on the plate-like member 32A.

The burst signal groups 8 of the magnetic recording medium 2 are reproduced by a magnetic recording and reproducing apparatus to be described below.

Figure 6:
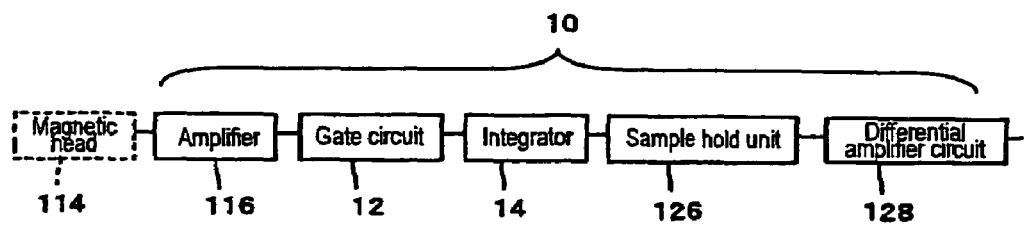
FIG. 6 is a block diagram showing a position control circuit of the magnetic recording and reproducing apparatus.

FIG. 6 is a block diagram showing a position control circuit 10 of the magnetic recording and reproducing apparatus (not shown) according to the first exemplary embodiment of the present invention. The position control circuit 10 corresponds to the conventional position control circuit 130 shown in FIG. 23 above. Incidentally, the magnetic recording and reproducing apparatus according to the first exemplary embodiment has the same configuration as that of the foregoing conventional magnetic recording and reproducing apparatus, except the magnetic recording medium 2 and the position control circuit 10. Identical parts in the diagram will thus be designated with the same reference numerals, and description thereof will be omitted (the same applies to the subsequent exemplary embodiments).

Now, the position control circuit 10, a characteristic part of the first exemplary embodiment of the present invention, will be described in detail.

As shown in FIG. 6, the position control circuit 10 comprises an amplifier 116, a gate circuit (an extractor) 12, an integrator 14 (the gate circuit 12 and the integrator 14 are included in a signal integration device), a sample hold unit 126, and a differential amplifier circuit 128. The gate circuit 12 extracts a part of each of reproduced signals corresponding to each of the burst signal groups 8 recorded on the magnetic recording medium 2 by removing end parts of each of the reproduced signals. The integrator calculates a area integral of the signal extracted by the gate circuit 12.

Figure 7:
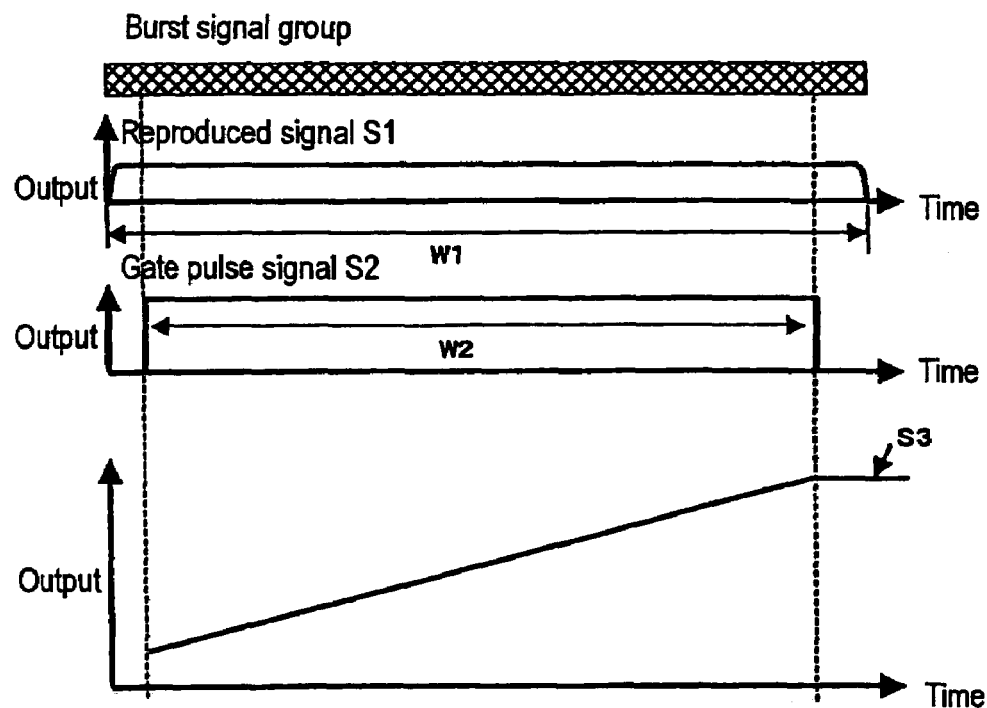
FIG. 7 is a schematic diagram showing the plane of a burst signal group on the magnetic recording medium of the magnetic recording and reproducing apparatus, a reproduced signal corresponding to the burst signal group, a gate pulse signal, and a position control signal.

The gate circuit 12 detects a servo mark which indicates the starting position of a burst pattern. With reference to this servo mark, the gate circuit 12 generates a gate pulse signal S2 such as shown in FIG. 7. FIG. 7 schematically shows the plane of a burst signal group 8 on the magnetic recording medium 2 of the magnetic recording and reproducing apparatus according to the first exemplary embodiment, a reproduced signal S1 corresponding to the burst signal group 8, a gate pulse signal S2, and a position control signal S3.

The gate pulse signal S2 is made of a rectangular gate pulse. A pulse width W2 of this gate pulse signal is set to be smaller than the pulse width W1 of each of the reproduced signals S1 corresponding to each of the burst signal groups 8. The gate pulse signal S2 is used to remove the end parts of each of the reproduced signals S1 corresponding to each of the burst signal groups 8, thereby extracting the other part of each of the reproduced signals S1 corresponding to each of the burst signal groups 8. Incidentally, the pulse width of each of the reproduced signals corresponding to each of burst signal groups shall refer to a value determined by dividing "the circumferential length of the convex portion (or concave portion) constituting each burst signal group" by "the circumferential velocity of the magnetic recording medium."

Next, description will be given of the operation of the magnetic recording and reproducing apparatus according to the first exemplary embodiment.

The reproduced signal S1 corresponding to a burst signal group 8 read by the magnetic head 114 is amplified by the amplifier 116, and then input to the integrator 14 via the gate circuit 12. Each of the reproduced signals S1 input to the integrator 14 is area integrated by the integrator 14 for the period when each gate pulse signal S2 generated for each of the reproduced signals S1 by the gate circuit 12 is output. This area integrated signal is output to the sample hold unit 126 as the position control signal S3. The differential amplifier 128 then determines a difference in output between the position control signal S3 of the burst signal group 8A and the position control signal S3 of the burst signal group 8B, or a difference in output between the position control signal S3 of the burst signal group 8C and the position control signal S3 of the burst signal group 8D held in the sample hold unit 126. The positional information of the magnetic head 114 is thus acquired, and then a positioning (tracking) control of the magnetic head 114 is performed.

The magnetic recording and reproducing apparatus according to the first exemplary embodiment comprises: the magnetic recording medium 2 on which a positional information is recorded in the form of burst signal groups each consisting of a single concave portion or a single convex portion of the predetermined concavo-convex pattern formed of the magnetic layer (in the first exemplary embodiment, each of the burst signal groups 8 consisting of a single convex portion); and the signal integration device (the gate circuit 12 and the integrator 14 in the first exemplary embodiment) for calculating the area integrals of each of the reproduced signals S1 corresponding to each of burst signal groups 8. This configuration makes it possible to increase the outputs of the position control signals and perform a precise positioning control.

In the method of controlling a magnetic recording and reproducing apparatus according to the first exemplary embodiment, the position control signals are generated by calculating the area integrals of each of the reproduced signals S1 corresponding to each of the burst signal groups 8 of the positional information which is recorded on the magnetic recording medium in the form of the burst signal groups 8 each consisting of a single concave portion or a single convex portion of the predetermined concavo-convex pattern formed of the magnetic layer (in the first exemplary embodiment, each of the burst signal groups 8 consisting of the convex portion), thereby performing a position control of the magnetic head based on the resulted position control signals. It is therefore possible to increase the outputs of the position control signals and perform a precise positioning control.

Moreover, the signal integration device includes the extractor (in the first exemplary embodiment, the gate circuit 12) for extracting a part of each of the reproduced signals S1 corresponding to each of the burst signal groups 8 by removing the end parts of each of the reproduced signals S1, and the integrator 14 for calculating the area integrals of the reproduced signal extracted. It is therefore possible to remove noise ascribable to variations in the configuration and arrangement of each of burst signal groups from each of reproduced signals, thereby stabilizing the position control signals. In particular, the extractor is configured to generate the gate pulse signal that has a pulse width W2 smaller than the pulse width W1 of each of the reproduced signals S1 corresponding to each of the burst signal groups 8, and extract a part of each of the reproduced signals by using the gate pulse signal. This simple structure can thus facilitate removing noise from each of the reproduced signals.

The magnetic recording medium 2 according to the first exemplary embodiment stores a positional information in the form of burst signal groups each consisting of either a single concave portion or a single convex portion of a predetermined concavo-convex pattern formed of the magnetic layer (in the first exemplary embodiment, each of the burst signal groups 8 consisting of convex portions). This makes it possible to reduce the manufacturing burden and the manufacturing cost and provide a magnetic recording and reproducing apparatus which is capable of increasing the output of the position control signal and performing a precise positioning control of the magnetic head. Besides, as compared to conventional magnetic recording media in which each of the burst signal groups is composed of a plurality of concave portions and a plurality of convex portions, area of the part which output a signal for each burst signal group is wider and thus higher output is allowed. Moreover, the smaller number of concave and convex portions can also reduce variations themselves in the configuration and arrangement of each burst signal group.

Furthermore, by using the stamper 30 for manufacturing a magnetic recording medium according to the first exemplary embodiment, it is possible to manufacture a magnetic recording medium which is capable of reducing the manufacturing burden and the manufacturing cost (for example, the magnetic recording medium 2 according to the first exemplary embodiment).

The inventors of the present invention made a measurement on the magnetic recording and reproducing apparatus according to the first exemplary embodiment and a conventional magnetic recording and reproducing apparatus, for the outputs of the position control signals.

In this experiment, the burst signal groups 8 were given a circumferential length of 8 µm (BL1 in FIG. 3 seen above), a circumferential spacing of 1 µm (BL3 in FIG. 3 seen above), a radial width of 200 nm (BW1 in FIG. 3 seen above), and a radial spacing of 200 nm (BW2 in FIG. 3 seen above). Incidentally, both the circumferential length and the circumferential spacing of the burst signal groups 8 were the values at a radial position of 20 mm from the center on a 2.5-inch disk. The data tracks were given a track pitch of 200 nm (127 kTPI) and a width of 120 nm.

The recording layers (magnetic layers) were perpendicular magnetic recording layers having a thickness of 15 nm. The burst signal groups 8 are formed of convex portions of the perpendicular magnetic recording layer, and were magnetized so as to generate servo signal fields. Specifically, the disks were placed between the poles of an electromagnet for generating a direct-current magnetic field of $1.2 \times 10^6$ A/m, with their disk surfaces in parallel to the pole surfaces. The servo regions of the perpendicular magnetic recording layers were then simultaneously magnetized to record servo information. The perpendicular magnetic recording layers were measured for magnetic characteristics in a vibrating sample magnetometer (VSM), and found to have a saturation magnetization Bs of 0.44 T and a residual saturation magnetization Br of 0.43 T.

Such magnetic recording media were rotated at a disk revolution speed of 4200 rpm so that magnetic heads flew in flight height of 11 nm above near the radial positions of 20 nm on the 2.5-inch disks. In that state, signals were recorded onto the data tracks from the magnetic heads with a write width of 200 nm. Subsequently, the burst patterns were reproduced with GMR magnetic heads, having a read width of 120 nm, and the magnetic recording and reproducing apparatus according to the first exemplary embodiment and the conventional apparatus were measured for the outputs of their position control signals.

Figure 8:
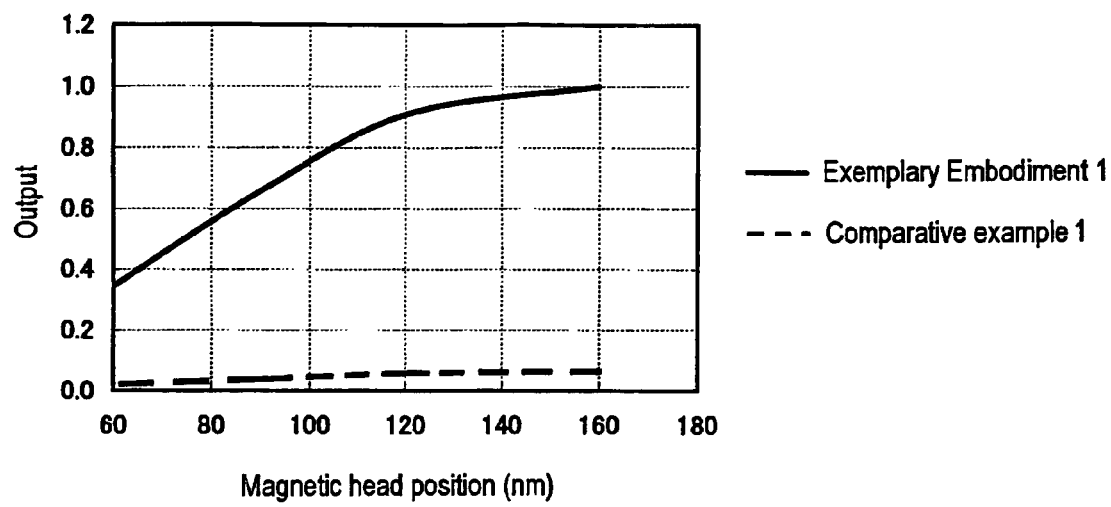
FIG. 8 is a graph showing the relationship between a magnetic head position in the magnetic recording and reproducing apparatus and the output of the position control signal.
Figure 9:
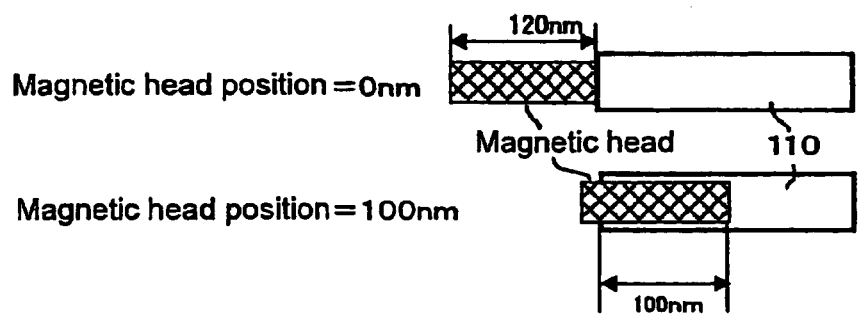
FIG. 9 is a diagram for explaining the definition of the magnetic head position in the graphs.

The measurements are shown in FIG. 8. FIG. 8 is a graph for showing the relationship between the magnetic head position and the output of the position control signal of a burst signal group 8A. The full line indicates the output of the magnetic recording and reproducing apparatus according to the first exemplary embodiment, and the dotted line the output of the conventional magnetic recording and reproducing apparatus (comparative example 1). The magnetic head position on the abscissa indicates, as shown in FIG. 9, the distance between the left end of the burst signal group 8A and the right end of the magnetic head. The output values on the ordinate are normalized with the output value of the first exemplary embodiment at the magnetic head position of 160 nm as 1.

From FIG. 8, it can be seen that the magnetic recording and reproducing apparatus according to the first exemplary embodiment provides position control signals of higher output than in the conventional magnetic recording and reproducing apparatus of the comparative example 1 across the entire range of data acquisition (magnetic head positions in the range of 60 to 160 nm).

The inventors of the present invention also made a measurement on the magnetic recording and reproducing apparatus according to the first exemplary embodiment and the conventional magnetic recording and reproducing apparatus for position error signals (PES) with respect to the magnetic head position.

Figure 10:
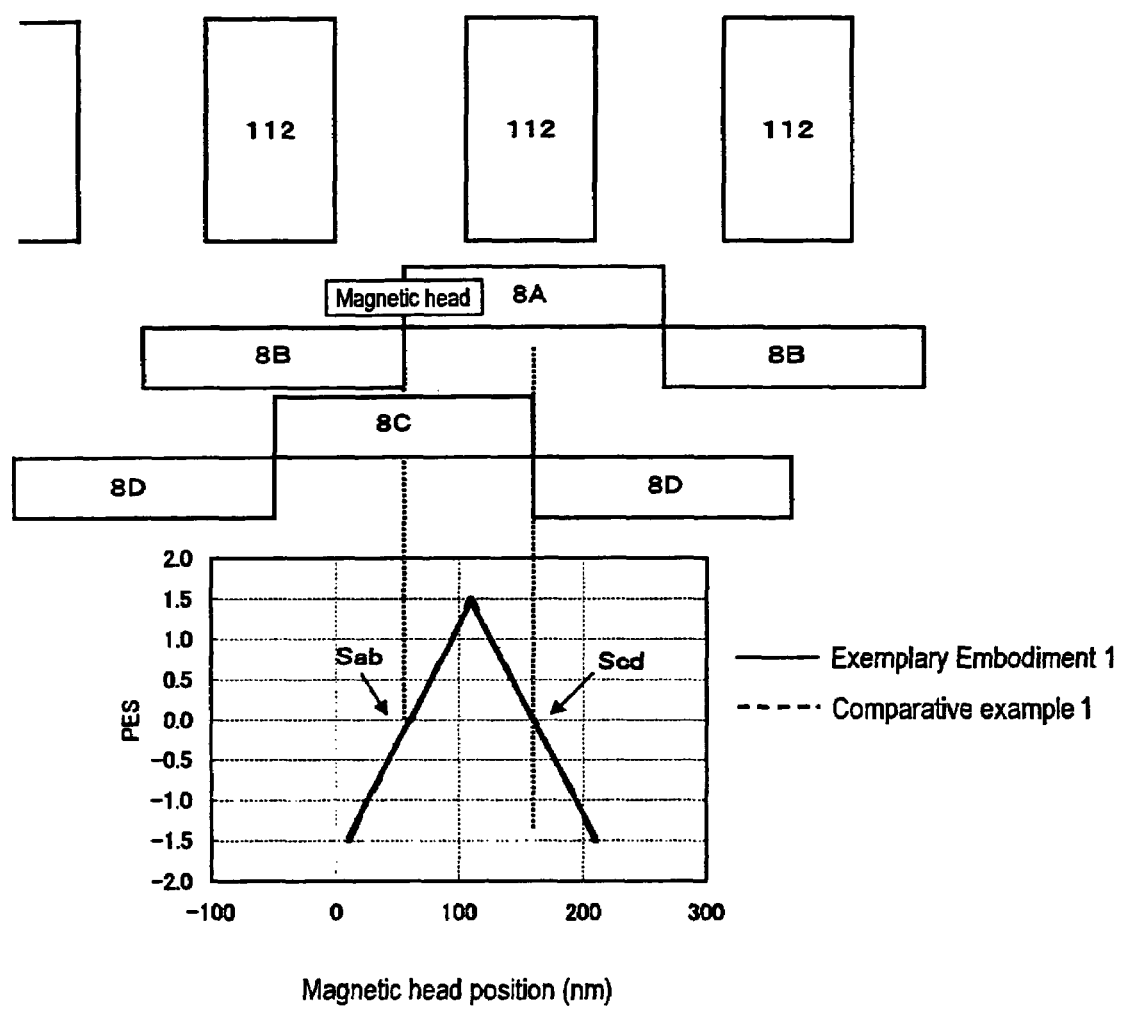
FIG. 10 is a diagram schematically showing the physical relationship between data tracks, burst signal groups on the magnetic recording medium, and the magnetic head of the magnetic recording and reproducing apparatus according to the first exemplary embodiment of the present invention, accompanied with a graph showing the relationship between the position of the magnetic head in that diagram and position error signals.

More specifically, as shown in FIG. 10, four types of burst signal groups 8A, 8B, 8C, and 8D were formed as the positional information on the magnetic recording media. Then, the magnetic heads were moved to measure a position error signal Sab obtained from the burst signal groups 8A and 8B and a position error signal Scd obtained from the burst signal groups 8C and 8D. Here, the position error signal Sab is given by (Sa−Sb)/(Sa+Sb), where Sa is the output of the position control signal from the burst signal group 8A, and Sb is the output of the position control signal from the burst signal group 8B. The position error signal Scd is given by (Sc−Sd)/(Sc+Sd), where Sc is the output of the position control signal from the burst signal group 8C, and Sd is the output of the position control signal from the burst signal group 8D.

The graph of FIG. 10 shows the relationship between the magnetic head position and the position error signals Sab and Scd according to the first exemplary embodiment and the comparative example 1. Incidentally, in the graph of FIG. 10, the upward-sloping lines (in magnetic head positions of 10 nm to 110 nm) represent the position error signals Sab, and the downward-sloping lines (in magnetic head positions of 110 nm to 210 nm) represent the position error signals Scd. The full lines represent the position error signals Sab and Scd of the magnetic recording and reproducing apparatus according to the first exemplary embodiment, and the dotted lines (mostly accordance with the full lines) represent the position error signals Sab and Scd of the conventional magnetic recording and reproducing apparatus.

From the graph of FIG. 10, it is confirmed that the position error signals of the magnetic recording and reproducing apparatus according to the first exemplary embodiment maintain linearity equivalent to that of the position error signals of the conventional magnetic recording and reproducing apparatus (comparative example 1).

As above, according to the magnetic recording and reproducing apparatus and the method of controlling the same of the first exemplary embodiment, it is possible to maintain the linearity of the position error signals while increasing the output of the position control signal and performing a precise positioning control.

The inventors of the present invention also made a measurement on the magnetic recording and reproducing apparatus according to the first exemplary embodiment and the conventional magnetic recording and reproducing apparatus for the number of track-address read errors and the bit error rate of user data of ten tracks per one revolution. As a result, the conventional magnetic recording and reproducing apparatus showed zero to fifteen track-address read errors per track (an average of 3.5 per track), and bit error rates of $2.6 \times 10^{-6}$ to $1.0 \times 10^{-7}$ per track. In contrast, the magnetic recording and reproducing apparatus of the first exemplary embodiment showed zero track-address read error throughout the ten tracks, and bit error rates of no higher than $1.0 \times 10^{-7}$ throughout the ten tracks.

The probable reason why the number of track-address read errors per track and the bit error rate per track can be reduced thus as compared to the conventional magnetic recording and reproducing apparatus is inferred that: it is possible to maintain the linearity of the position error signals while increasing the output of the position control signal and removing noise ascribable to variations in the configuration and arrangement of the burst signal groups from the reproduced signal.

Second Exemplary Embodiment

Figure 11:
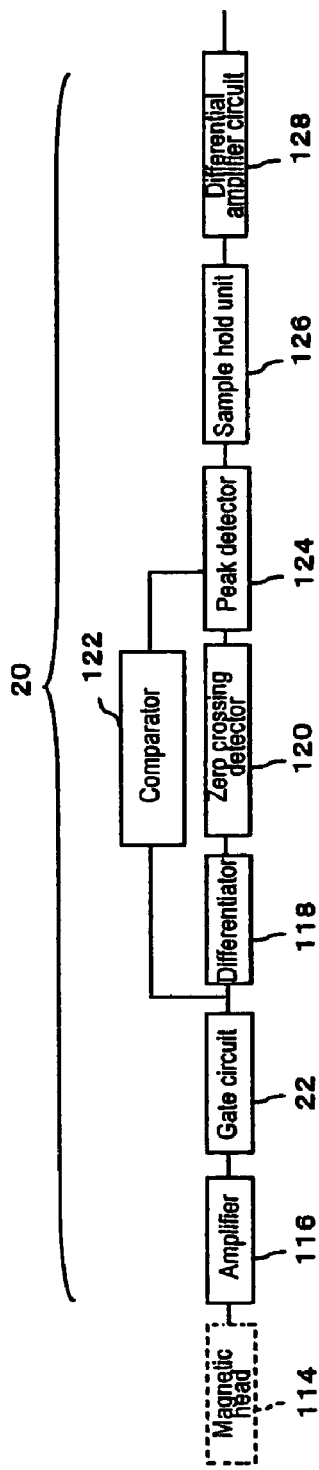
FIG. 11 is a block diagram showing the position control circuit of the magnetic recording and reproducing apparatus according to a second exemplary embodiment of the present invention.

FIG. 11 is a block diagram showing a position control circuit 20 of a magnetic recording and reproducing apparatus (not shown) according to the second exemplary embodiment of the present invention.

The magnetic recording and reproducing apparatus according to the second exemplary embodiment has the position control circuit 20 instead of the position control circuit 10 in the foregoing first exemplary embodiment. The rest of the configuration is the same as in the foregoing first exemplary embodiment.

Figure 23:
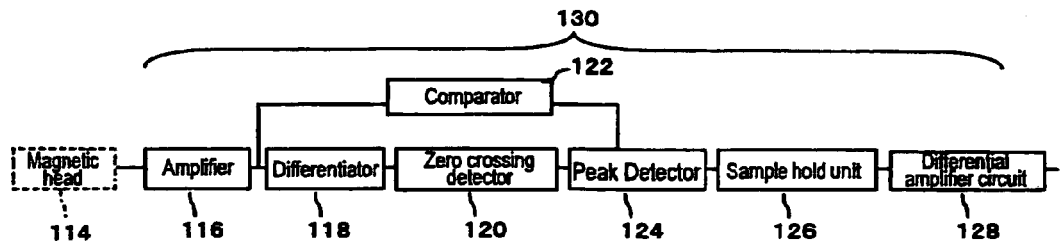
FIG. 23 is a block diagram showing a position control circuit of the magnetic recording and reproducing apparatus.
Figure 24:
FIG. 24 is a diagram schematically showing the plane of a burst signal group on the magnetic recording medium of the magnetic recording and reproducing apparatus and the reproduced signal of their concavo-convex pattern.
Figure 24:

This position control circuit 20 is formed by interposing a gate circuit (a signal extractor) 22 between the amplifier 116 and the differentiator 118 of the conventional position control circuit 130 shown in FIG. 23.

Figure 12:
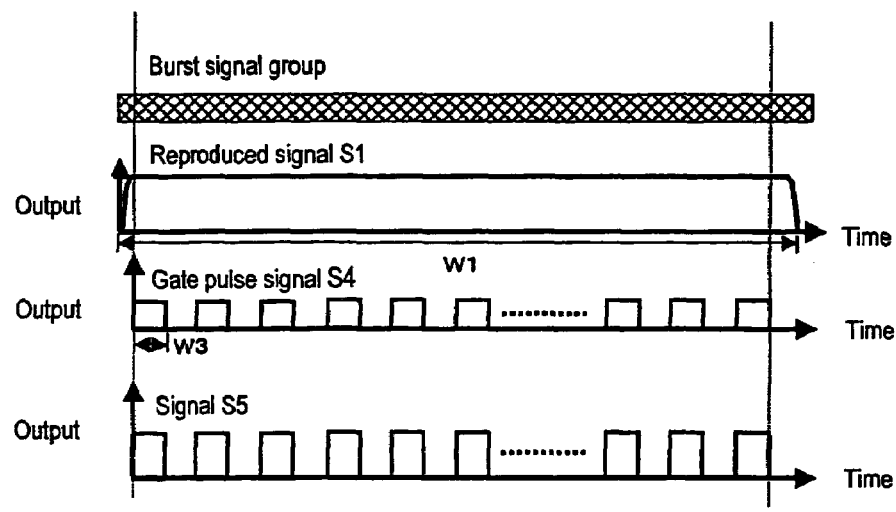
FIG. 12 is a schematic diagram showing the plane of a burst signal group on the magnetic recording medium of the magnetic recording and reproducing apparatus, a reproduced signal corresponding to the burst signal group, gate pulse signals, and signals generated from the reproduced signal and the gate pulse signals.

The gate circuit 22 detects a servo mark which indicates the starting position of a burst pattern. With reference to this servo mark, the gate circuit 22 generates a plurality of gate pulse signals S4 for each of burst signal groups 8 such as shown in FIG. 12. These gate pulse signals S4 correspond to the pattern of the plurality of convex portions or the plurality of concavo portions which constitute the burst signal group of the conventional magnetic recording medium 100. FIG. 12 schematically shows the plane of a single burst signal group 8 on the magnetic recording medium 2 in the magnetic recording and reproducing apparatus according to the second exemplary embodiment, a reproduced signal S1 corresponding to the single burst signal group 8, the gate pulse signals S4, and signals S5 which are generated from the reproduced signal S1 and the gate pulse signals S4.

In the magnetic recording and reproducing apparatus according to the second exemplary embodiment, the gate circuit 22 generates the plurality of gate pulse signals S4 in response to a single pulse of each of the reproduced signals S1. Then, the plurality of gate pulse signals S4 are used to extract a plurality of parts of the reproduced signal S1 corresponding to single burst signal group 8, thereby generating the signals S5.

Each of the reproduced signals S1 corresponding to each of the burst signal groups 8 read by the magnetic head 114 is amplified by the amplifier 116, and then output from the gate circuit 22 only when each gate pulse signal S4 generated by the gate circuit 22 is output. The resultant is thus extracted as the signals S5.

These signals S5 extracted by the gate circuit 22 are input to the differentiator 118. The reproduced signals differentiated by the differentiator 118 are passed through the zero crossing detector 120, and then input to the peak detector 124. Subsequently, the peak detector 124 detects the position where the gate pulse signal from the comparator 122 and the signal from the zero crossing detector 120 both are present. The reproduced output from the amplifier 116 at that position is the maximum output (peak output). This maximum output is output to the sample hold unit 126 as a position control signal. Then, the differential amplifier 128 determines a difference in output between the position control signals of the burst signal group 8A and the burst signal group 8B, or a difference in output between the position control signals of the burst signal group 8C and the burst signal group 8D held in the sample hold unit 126. The positional information of the magnetic head 114 is thus acquired, and then a positioning control of the magnetic head 114 is performed.

The magnetic recording and reproducing apparatus according to the second exemplary embodiment comprises: the magnetic recording medium 2 on which a positional information is recorded in the form of burst signal groups each consisting of a single concave portion or a single convex portion of a predetermined concavo-convex pattern formed of the magnetic layer (in the second exemplary embodiment, the burst signal groups 8 consisting of a single convex portion); and the signal extractor (in the second exemplary embodiment, the gate circuit 22) for generating the plurality of gate pulse signals S4 each having a pulse width W3 smaller than the pulse width W1 of the reproduced signal S1 corresponding to each of the burst signal groups 8, and extracting a plurality of parts of the reproduced signal S1 by using the plurality of gate pulse signals S4. It is therefore possible to reduce the manufacturing burden and the manufacturing cost while constituting most of the position control circuit 20 by using the components of the conventional position control circuit 130. As compared to the magnetic recording and reproducing apparatus according to the foregoing first exemplary embodiment, it is therefore possible to achieve lower cost and a shorter development period.

Moreover, noise ascribable to variations in the configuration and arrangement of the burst signal groups can be removed from the reproduced signal, whereby the position control signal is stabilized.

In the method of controlling a magnetic recording and reproducing apparatus according to the second exemplary embodiment, the gate pulse signal S4 is generated, the plurality of gate pulse signals S4 each having a pulse width W3 smaller than the pulse width W1 of the reproduced signal S1 corresponding to each of the burst signal groups, which consists of a single concave portion or a single convex portion of the predetermined concavo-convex pattern formed of the magnetic layer (in the present second exemplary embodiment, each of the burst signal groups 8 consisting of a single convex portion) of the magnetic recording medium 2 on which the positional information is recorded in the form of the burst signal groups. Besides, a plurality of signals S5 extracted by using the plurality of gate pulse signals S4 are used to perform a positioning control of the magnetic head. It is therefore possible to reduce the manufacturing burden and the manufacturing cost, and achieve a shorter development period as well.

The inventors of the present invention made a measurement on the magnetic recording and reproducing apparatus according to the second exemplary embodiment and a conventional magnetic recording and reproducing apparatus, for the outputs of the position control signals under the same condition as with the foregoing first exemplary embodiment.

Figure 13:
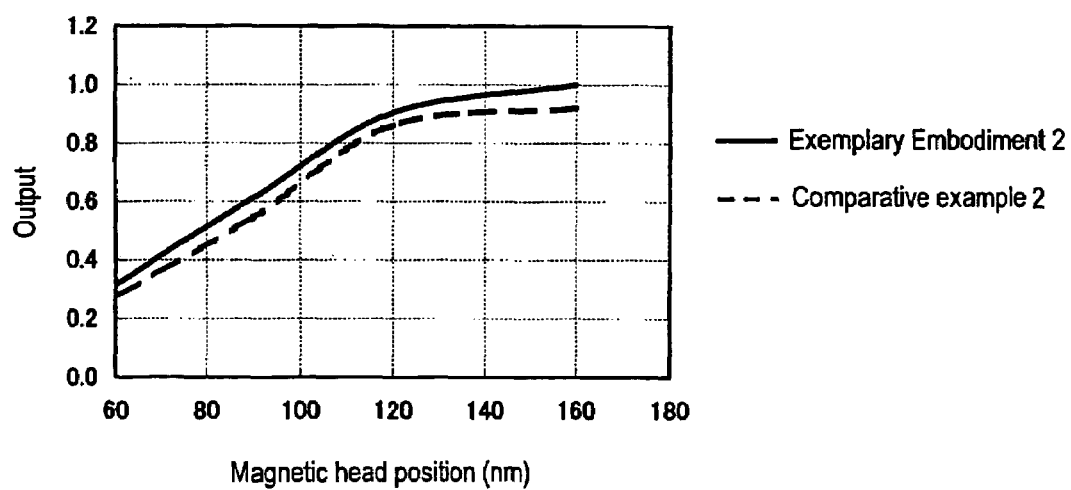
FIG. 13 is a graph showing the relationship between the magnetic head position of the magnetic recording and reproducing apparatus and the output of the position control signal.

The measurements are shown in FIG. 13. FIG. 13 is a graph for showing the relationship between the magnetic head position and the output of the position control signal of a burst signal group 8A. The full line indicates the output of the magnetic recording and reproducing apparatus according to the present second exemplary embodiment, and the dotted line indicates the output of the conventional magnetic recording and reproducing apparatus (comparative example 2). The output values on the ordinate are normalized with the output value of the second exemplary embodiment at the magnetic head position of 160 nm as 1.

From FIG. 13, it can be seen that the magnetic recording and reproducing apparatus according to the second exemplary embodiment provides position control signals of higher reproduced output than in the conventional magnetic recording and reproducing apparatus of the comparative example 2 across the entire range of data acquisition (magnetic head positions in the range of 60 to 160 nm).

The reason seems to be that while demagnetizing fields can occur from the sidewalls of the convex or concave portions of the magnetic layer, the impact of the demagnetizing fields from the sidewalls is small since each of the burst signal groups 8 consists of a single convex portion.

The inventors of the present invention also made a measurement on the magnetic recording and reproducing apparatus according to the second exemplary embodiment and the conventional magnetic recording and reproducing apparatus for position error signals with reference to the magnetic head position.

Figure 14:
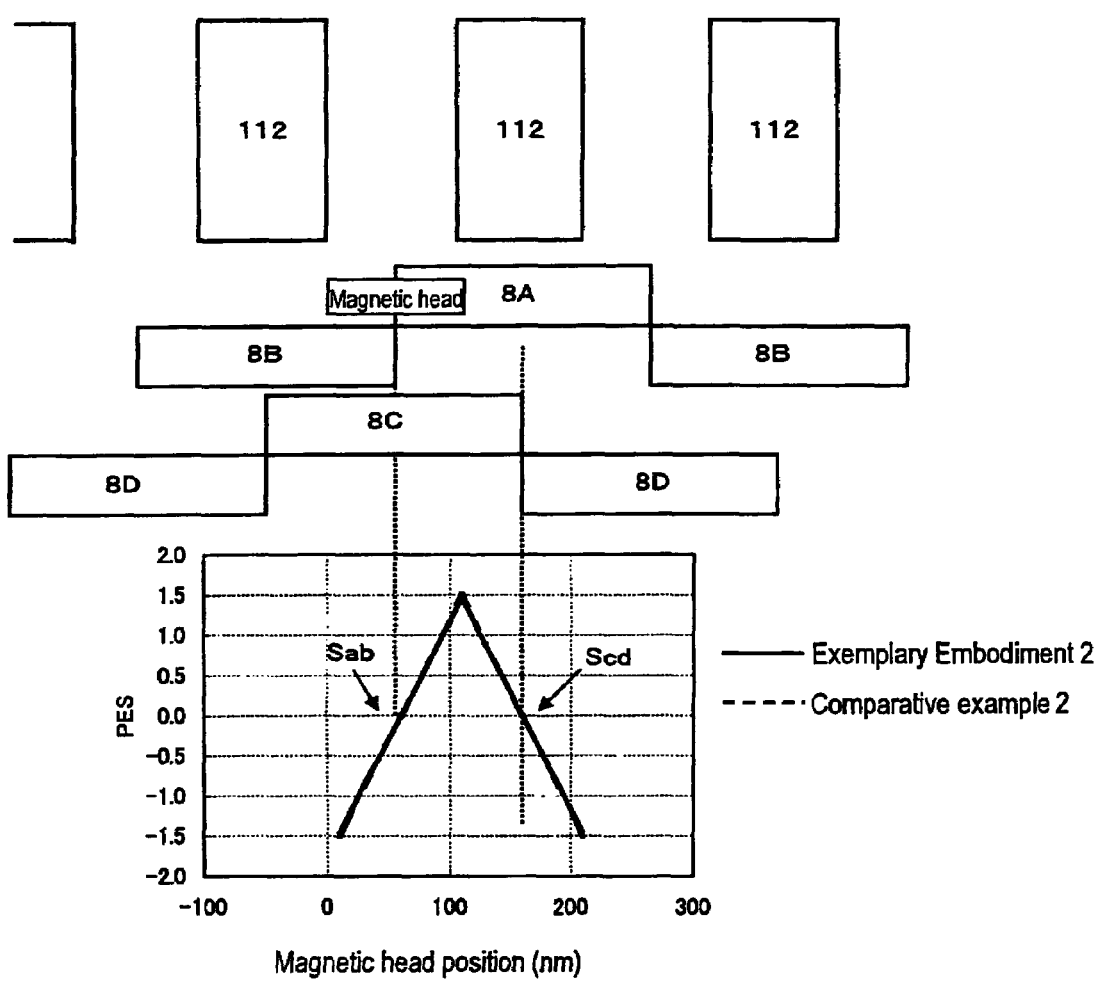
FIG. 14 is a diagram schematically showing the physical relationship between data tracks, burst signal groups on the magnetic recording medium, and the magnetic head of the magnetic recording and reproducing apparatus according to a second exemplary embodiment of the present invention, accompanied with a graph showing the relationship between the position of the magnetic head in that diagram and position error signals.

Consequently, as shown in the graph of FIG. 14, it is confirmed that the position error signals of the magnetic recording and reproducing apparatus according to the second exemplary embodiment maintain linearity equivalent to that of the position error signals of the conventional magnetic recording and reproducing apparatus. In FIG. 14, the full lines represent the position error signals of the magnetic recording and reproducing apparatus according to the present second exemplary embodiment, and the dotted lines (mostly accordance with the full lines) represent the position error signals of the conventional magnetic recording and reproducing apparatus.

Moreover, the inventors of the present invention also made a measurement on the magnetic recording and reproducing apparatus according to the second exemplary embodiment and the conventional magnetic recording and reproducing apparatus for the number of track-address read errors and the bit error rate of user data of ten tracks per one revolution. As a result, the conventional magnetic recording and reproducing apparatus showed zero to fifteen track-address read errors per track (an average of 3.5 per track), and bit error rates of $2.6 \times 10^{-6}$ to $1.0 \times 10^{-7}$ per track. In contrast, the magnetic recording and reproducing apparatus of the second exemplary embodiment showed zero track-address read error throughout the ten tracks, and bit error rates of no higher than $1.0 \times 10^{-7}$ throughout the ten tracks.

The probable reason why the number of track-address read errors per track and the bit error rate per track can be reduced thus as compared to the conventional magnetic recording and reproducing apparatus is that: it is possible to increase the output of the position control signal and remove noise ascribable to variations in the configuration and arrangement of the burst signal groups from the reproduced signal, while maintaining the linearity of the position error signals.

Third Exemplary Embodiment

Figure 25:
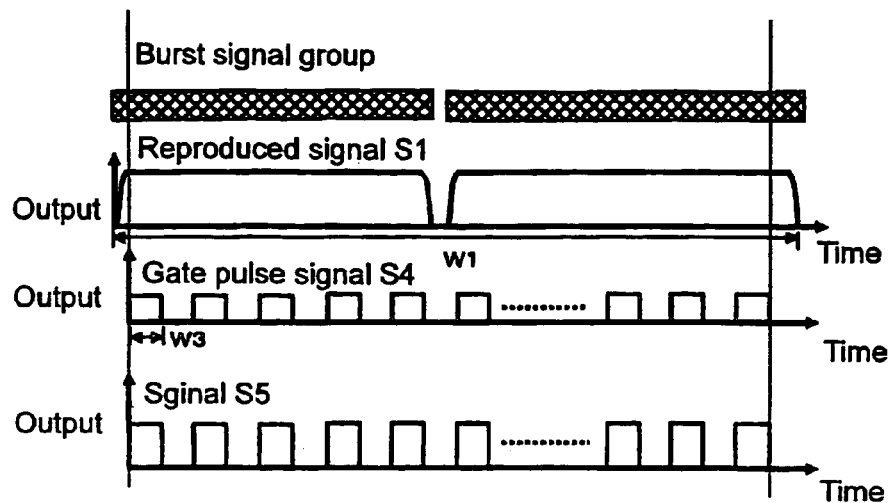
FIG. 25 is a schematic diagram showing the plane of a burst signal group on the magnetic recording medium of the magnetic recording and reproducing apparatus according to a third exemplary embodiment of the present invention, reproduced signals corresponding to the burst signal group, gate pulse signals, and signals generated from the reproduced signals and the gate pulse signals.

FIG. 25 is a schematic diagram showing the plane of a single burst signal group on the magnetic recording medium of the magnetic recording and reproducing apparatus according to the third exemplary embodiment, reproduced signals corresponding to the single burst signal group, gate pulse signals, and signals generated from the reproduced signals and the gate pulse signals.

Each of single burst signal groups of the magnetic recording and reproducing apparatus according to the third exemplary embodiment consists of two convex portions and one concave portion. The rest of the configuration is the same as in the foregoing second exemplary embodiment.

In the magnetic recording and reproducing apparatus according to the third exemplary embodiment, the gate circuit 22 generates the plurality of gate pulse signals S4 for each of the reproduced signals S1 corresponding to either one of a single concave portion and a single convex portion (in the third exemplary embodiment, a single convex portion) included each of the burst signal groups 8 in response to a single pulse of each of the reproduced signals S1. Then, the plurality of gate pulse signals S4 are used to extract a plurality of parts of the reproduced signal S1 corresponding to either one of a single concave portion and a single convex portion, thereby generating the signals S5.

Therefore, it is possible to reduce the manufacturing burden and the manufacturing cost while constituting most of the position control circuit 20 by using the components of the conventional position control circuit 130 by the third exemplary embodiment as well as the second exemplary embodiment. It is therefore possible to achieve lower cost and a shorter development period as compared to the magnetic recording and reproducing apparatus according to the foregoing first exemplary embodiment by the third exemplary embodiment.

Moreover, noise ascribable to variations in the configuration and arrangement of the burst signal groups can be removed from the reproduced signal, whereby the position control signal is stabilized.

Although each of the burst signal groups does not consist of either one of a single concave portion and a single convex portion, area of the part which output a signal for each of the burst signal groups becomes wider by reducing the number of convex portions and concave portions composing each burst signal group as compared to conventional magnetic recording and reproducing apparatus that has a magnetic recording medium in which each of the burst signal groups is composed of about ten to thirty concave portions and convex portions and thus higher output is allowed. Moreover, the smaller number of concave and convex portions can also reduce variations themselves in the configuration and arrangement of each burst signal group.

Incidentally, the magnetic recording and reproducing apparatus and the method of controlling the same are not limited to those of the foregoing first to third exemplary embodiments.

For example, while the position control circuit 10 of the foregoing first exemplary embodiment has the gate circuit 12, the gate circuit 12 may be omitted, for example, when noise occurring in the reproduced signal due to variations in the configuration and arrangement of the burst signal groups of the positional information is low. That is, the signal integration device may have any configuration as long as it can calculate a area integral of the reproduced signal corresponding to burst signal groups.

The foregoing first exemplary embodiment has dealt with the case where a part of the reproduced signal S1 is extracted by using single gate pulse signal S2. Nevertheless, parts of the reproduced signal S1 may be extracted by using a plurality of gate pulse signals.

Figure 15:
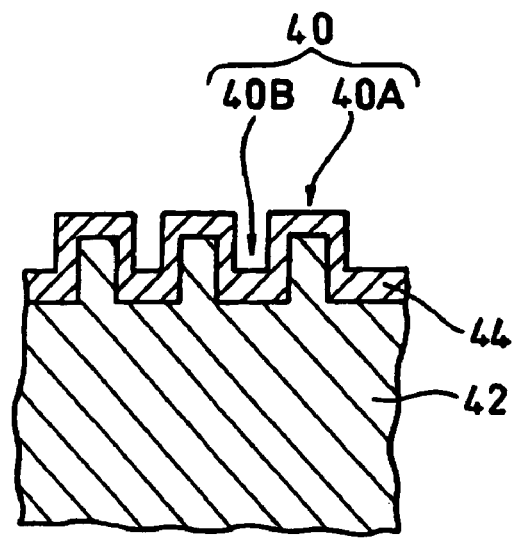
FIG. 15 is a schematic cross-sectional side view showing a second example of the concavo-convex pattern in the servo regions of the magnetic recording medium according to the present invention.

The configuration of the "concavo-convex pattern" is not limited to that of the concavo-convex pattern described in the foregoing first exemplary embodiment, either. For example, as with the concavo-convex pattern 40 shown in FIG. 15, a magnetic layer 44 may be laminated to cover a concavo-convex pattern formed on a substrate 42 so that the magnetic layer 44 makes the concavo-convex pattern including convex portions 40A and concave portions 40B as well.

Figure 16:
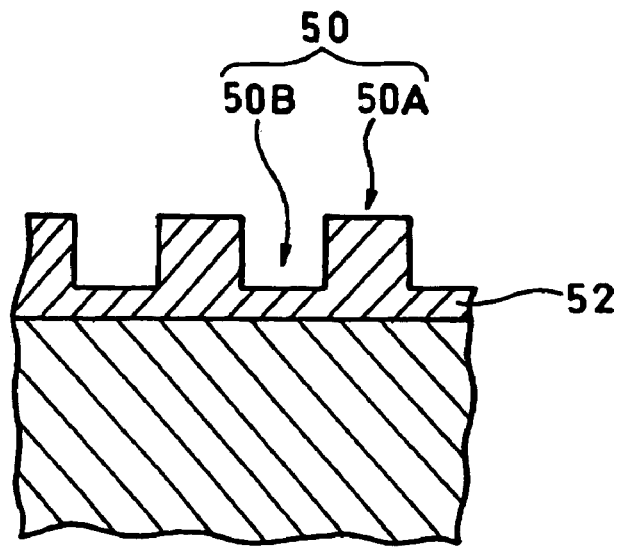
FIG. 16 is a schematic cross-sectional side view showing a third example of the concavo-convex pattern in the servo regions of the magnetic recording medium according to the present invention.

Moreover, as with the concavo-convex pattern 50 shown in FIG. 16, a magnetic layer 52 may be formed into a concavo-convex pattern including convex portions 50A and concave portions 50B as well.

Figure 17:
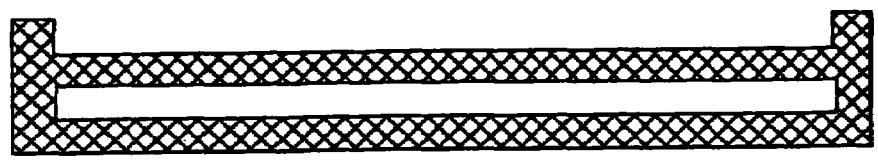
FIG. 17 is a schematic plan view showing another example of the burst signal groups in the servo regions of the magnetic recording medium according to the present invention.
Figure 18:
FIG. 18 is a diagram schematically showing the waveform of the signal reproduced from the concavo-convex pattern on the magnetic recording medium.
Figure 19:
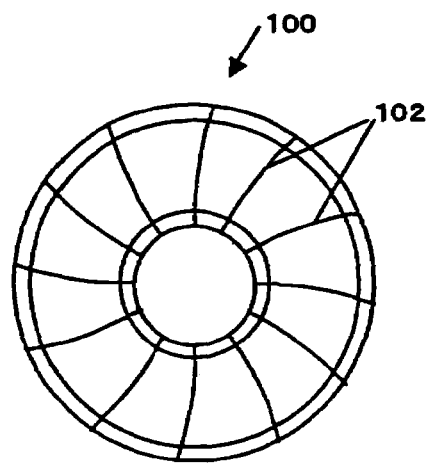
FIG. 19 is a schematic plan view of the magnetic recording medium of a conventional magnetic recording and reproducing apparatus.
Figure 20:
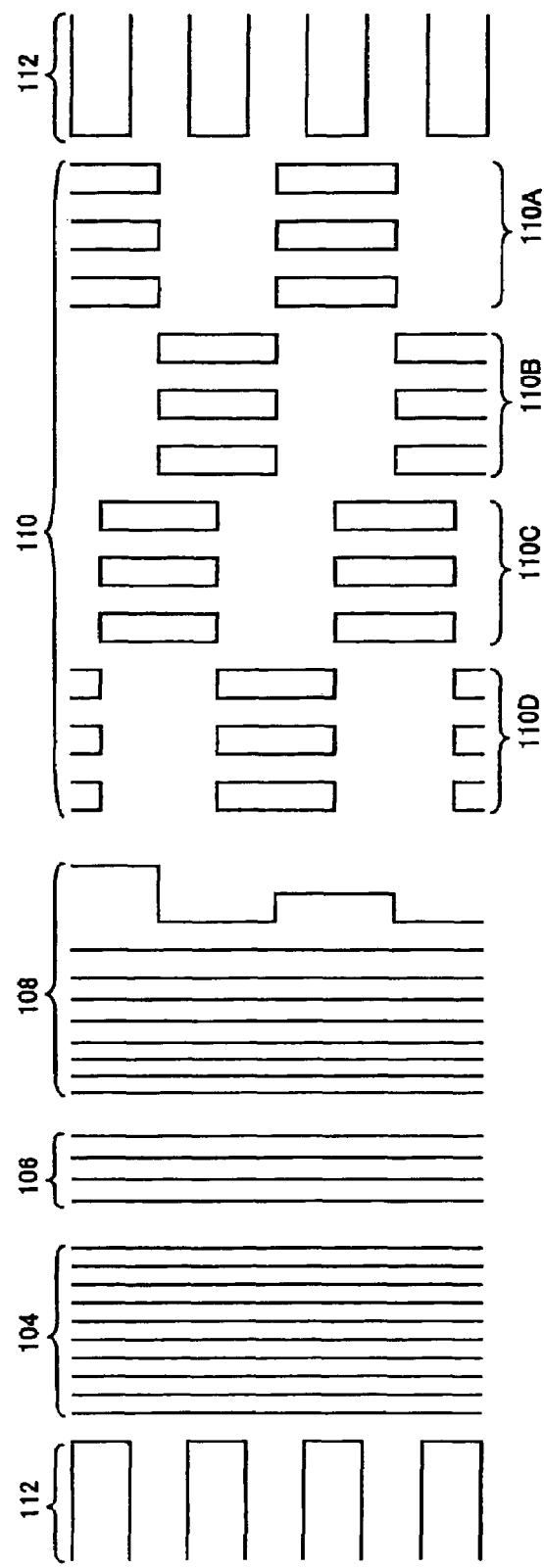
FIG. 20 is a schematic partial enlarged view of the vicinity of a servo region on the magnetic recording medium of the magnetic recording and reproducing apparatus.
Figure 21:
FIG. 21 is a schematic partial enlarged view of a burst signal group in the servo region of the magnetic recording medium of the magnetic recording and reproducing apparatus.

The configuration of the "burst signal groups" is not limited to that of the burst signal groups described in the foregoing first to third exemplary embodiments, either. As shown in FIG. 17, the areas of the convex portions shown in FIG. 3 above (the crosshatched areas in FIG. 3) may be formed as concave portions of a concavo-convex pattern (the blank areas in FIG. 17). In this case, the areas of the concave portions in FIG. 3 above are formed into convex portions made of the magnetic layer, so that the reproduced signal of the burst pattern (concavo-convex pattern) shows such a waveform as shown in FIG. 18. Here, the same effects as those of the foregoing first exemplary embodiment can be obtained when the extractor extracts a part of the reproduced signal corresponding to the burst signal group consisting of the concave portion by removing the end parts of the reproduced signal. The same applies to the second exemplary embodiment.

The foregoing first to third exemplary embodiments have dealt with the cases where a discrete track medium, having user data regions in which concentric recording tracks are made of convex portions of a magnetic layer and are magnetically separated from each other by a plurality of concentric grooves (concave portions of the concavo-convex pattern), is employed as an example of the magnetic recording medium.

However, for example, various exemplary embodiments of the present invention may be applied to a so-called patterned medium where the magnetic layer is sectioned into mesh-like or dot-like convex portions which are isolated from one another in an island fashion (each recording track is magnetically separated into a plurality of portions even in the circumferential direction). Otherwise, user data regions may be made of respective continuous magnetic layers having no concavo-convex pattern.

Furthermore, while the four types of burst signal groups 8A, 8B, 8C, and 8D are formed as the positional information on the magnetic recording medium, for example, only a pair of burst signal groups 8A and 8B may be formed. The arrangement of the burst signal groups with respect to the data tracks is not particularly limited, either. For example, the burst signal groups 8A and 8B and the burst signal groups 8C and 8D, or each pair of pieces of the positional information, may be arranged at staggered positions ⅓ track pitch off from each other.

The various exemplary embodiments of the present invention is applicable to a magnetic recording and reproducing apparatus having such a magnetic recording medium as a discrete track medium and a patterned medium, a method of controlling the same, such a magnetic recording medium, and a stamper for manufacturing such a magnetic recording medium.

What is claimed is:

1. A magnetic recording and reproducing apparatus comprising:
    a magnetic recording medium on which a positional information is recorded in form of burst signal groups each consisting of either one of a single concave portion and a single convex portion of a concavo-convex pattern formed of a magnetic layer; and
    a signal integration device for calculating an area integral of each of reproduced signals corresponding to each of the burst signal groups,
    wherein the signal integration device includes:
        an extractor for extracting a part of each of reproduced signals corresponding to each of the burst signal groups by removing parts of each of the reproduced signals corresponding to end parts of either one of the single concave portion and the single convex portion of each of the burst signal groups; and
        an integrator for calculating an area integral of each of the reproduced signals extracted.

2. The magnetic recording and reproducing apparatus according to claim 1, wherein
    the extractor is configured to generate a gate pulse signal having a pulse width smaller than that of each of the reproduced signals corresponding to each of the burst signal groups, and extract the part of each of the reproduced signals by using the gate pulse signal.

3. A magnetic recording and reproducing apparatus comprising:
    a magnetic recording medium on which a positional information is recorded in form of burst signal groups each consisting of either one of a single concave portion and a single convex portion of a concavo-convex pattern formed of a magnetic layer; and
    a signal extractor for generating a plurality of gate pulse signals for each of reproduced signals corresponding to each of the burst signal groups, the gate pulse signals each having a pulse width smaller than that of each of the reproduced signals, and extracting a plurality of parts of each of the reproduced signals by using the plurality of gate pulse signals.

4. A magnetic recording and reproducing apparatus comprising:
    a magnetic recording medium on which a positional information is recorded in form of burst signal groups each including concave portions and convex portions of a concavo-convex pattern formed of a magnetic layer; and
    a signal extractor for generating a plurality of gate pulse signals for each of reproduced signals corresponding to either one of each concave portion among the concave portions and each convex portion among the convex portions included each of the burst signal groups, the gate pulse signals each having a pulse width smaller than that of each of the reproduced signals, and extracting a plurality of parts of each of the reproduced signals by using the plurality of gate pulse signals.

5. A method of controlling a magnetic recording and reproducing apparatus, comprising the steps of:
    calculating an area integral of each of reproduced signals corresponding to each of burst signal groups of a positional information recorded on a magnetic recording medium in form of the burst signal groups to generate a position control signal, each of the burst signal groups consisting of either one of a single concave portion and a single convex portion of a concavo-convex pattern formed of a magnetic layer; and
    performing a positioning control of a magnetic head based on the position control signal,
    wherein when calculating the area integral of each of reproduced signals corresponding to each of the burst signal groups, a part of each of the reproduced signals is extracted by removing parts of each of the reproduced signals corresponding to end parts of either one of the single concave portion and the single convex portion of each of the burst signal groups, then the area integral of each of the reproduced signals extracted is calculated.

6. The method of controlling a magnetic recording and reproducing apparatus according to claim 5, wherein
a gate pulse signal having a pulse width smaller than that of each of the reproduced signals corresponding to each of the burst signal groups is generated, and the part of each of the reproduced signals is extracted by using the gate pulse signal.

7. A method of controlling a magnetic recording and reproducing apparatus, comprising the steps of:
generating a plurality of gate pulse signals for each of reproduced signals corresponding to each of burst signal groups of a positional information recorded on a magnetic recording medium in form of the burst signal groups, the gate pulse signals each having a pulse width smaller than that of each of the reproduced signals, each of the burst signal groups consisting of either one of a single concave portion and a single convex portion of a concavo-convex pattern formed of a magnetic layer;
extracting a plurality of parts of each of the reproduced signals by using the plurality of gate pulse signals; and
performing a positioning control of a magnetic head by using the extracted parts of the reproduced signal.

8. A method of controlling a magnetic recording and reproducing apparatus, comprising the steps of:
generating a plurality of gate pulse signals for each of reproduced signals corresponding to either one of each concave portion among concave portions and each convex portion among convex portions included each of burst signal groups of a positional information recorded on a magnetic recording medium in form of the burst signal groups, the gate pulse signals each having a pulse width smaller than that of each of the reproduced signals, each of the burst signal groups including concave portions and convex portions of a concavo-convex pattern formed of a magnetic layer;
extracting a plurality of parts of each of the reproduced signals by using the plurality of gate pulse signals; and
performing a positioning control of a magnetic head by using the extracted parts of the reproduced signal.

9. A magnetic recording medium on which a positional information is recorded in form of burst signal groups each consisting of a single convex portion of a concavo-convex pattern formed of a magnetic layer, the single convex portion is longer in circumferential direction than in radial direction.

10. A stamper for manufacturing a magnetic recording medium provided with a concavo-convex pattern having a concavo-convex shape corresponding to a concavo-convex shape of a concavo-convex pattern of a magnetic recording medium, a positional information being recorded on the magnetic recording medium in form of burst signal groups each consisting of a single convex portion of a concavo-convex pattern formed of a magnetic layer, the single convex portion being longer in circumferential direction than in radial direction.

11. A magnetic recording and reproducing apparatus comprising:
a magnetic recording medium on which a positional information is recorded in form of burst signal groups each consisting of a single convex portion of a concavo-convex pattern formed of a magnetic layer, the single convex portion being longer in circumferential direction than in radial direction; and
a signal integration device for calculating an area integral of each of reproduced signals corresponding to each of the burst signal groups.

12. A method of controlling a magnetic recording and reproducing apparatus, comprising the steps of:
calculating an area integral of each of reproduced signals corresponding to each of burst signal groups of a positional information recorded on a magnetic recording medium in form of the burst signal groups to generate a position control signal, each of the burst signal groups consisting of a single convex portion of a concavo-convex pattern formed of a magnetic layer, the single convex portion being longer in circumferential direction than in radial direction; and
performing a positioning control of a magnetic head based on the position control signal.

* * * * *